United States Patent [19]

Souza

[11] 3,796,394

[45] Mar. 12, 1974

[54] CASSETTE

[75] Inventor: Augustine A. Souza, San Jose, Calif.

[73] Assignee: Polygon Concepts, Inc., Los Altos, Calif.

[22] Filed: Apr. 22, 1971

[21] Appl. No.: 136,365

[52] U.S. Cl. .................................. 242/199, 274/4 C

[51] Int. Cl.... G03b 1/04, G11b 15/32, G11b 23/04

[58] Field of Search ............................ 242/197–200, 242/76, 189, 190; 179/100.2 Z; 274/4 C, 11 C; 352/72, 78

[56] References Cited

UNITED STATES PATENTS

| | | | |
|---|---|---|---|
| 3,674,942 | 7/1972 | Sugaya et al. | 179/100.2 Z |
| 3,495,787 | 2/1970 | Wallace | 242/199 |
| 3,027,111 | 3/1962 | Redfield | 242/198 |
| 3,065,922 | 11/1962 | Ballauf | 242/199 |
| 2,568,339 | 9/1951 | Jacobson | 242/209 X |
| 3,075,427 | 1/1963 | Salzmann | 242/76 X |
| 2,676,766 | 4/1954 | Ross et al. | 242/76 |

FOREIGN PATENTS OR APPLICATIONS

| | | | |
|---|---|---|---|
| 793,688 | 9/1968 | Canada | 242/197 |

*Primary Examiner*—Leonard D. Christian

[57] ABSTRACT

A cassette comprising a pair of identical sleeves in mating relationship enclose a tape reel and hub assembly, a tape guiding and tensioning member assembly and a tape back-up pressure assembly. The sleeves are inserted within a body member and removably held therein mechanically. This construction eliminates the need for sonic welding and liquid bonding. The elimination of undercuts in the design and the above method of assembly permits the use of low cost materials and manufacturing techniques. For tape control during tape run-up, running, and changing of the direction of tape movement there is provided tape guiding and tensioning members in the form of a plurality of self-adjusting idler rollers which absorb tape shock and slacks for reducing whipping, looping, spilling and other tape jamming events. A plurality of cantilever mounted resilient spring-like members are further provided for applying a variable degree of retarding force through friction to the tape reel hubs to further reduce tape jamming. To permit removal of the sleeves and various assemblies enclosed therein, the sleeves are provided with means for manually releasing the sleeves from the body member.

13 Claims, 39 Drawing Figures

INVENTOR.
AUGUSTINE A. SOUZA
BY Warren M Becker
J. Rosenblum
ATTORNEYS

CASSETTE

BACKGROUND OF THE INVENTION

The cassette, substantially a self-contained magnetic tape and tape handling device, was originally conceived to replace the 45 RPM phonograph record. It was the intention of the designers to overcome the disadvantages of the vinyl disc which is prone to damage, has a limited life, possesses severe limitations on the amount of music that can be recorded on it and requires a large costly non-mobile player unit that generally can only be used effectively when placed absolutely flat. In addition, the user has no means of making recordings on the discs. Initially the cost factor was the single most important consideration in determining the design of the cassette and all other considerations were subordinated to this end goal.

When the cassette became available to the general and business public the potential use of the method for low cost, improved audio, digital data and video storage became apparent.

Presently available cassettes, however, are relatively expensive to manufacture, suffer from problems of tape looping and jamming and exhibit insufficient fidelity; a severe problem especially when they are used for digital and video storage.

Tape jamming, whipping, looping, and jerking, resulting in unsatisfactory reproduction of recorded data and poor audio fidelity, is attributed in great measure to poor tape velocity control. Poor tape velocity control, a problem at low tape speeds, becomes a severe obstacle to high speed recording and reproduction.

Until the advent of the present invention, sonic welding, liquid bonding and the use of screws and the like have predominated in the assembly of cassettes. Because sonic welding changes the 'memory' of plastic and results in a brittle cassette costly materials are presently used to obtain a shock proof product. Then, too, sonic welds vary in strength and thus cassettes vary in strength. Moreover, this weld often leaves tiny pinholes (of the order of 1 mil in size) that permit the entrance of dust and dirt that is harmful to the magnetic surface on the tape used therein. Overcoming the effects of sonic welding requires the use of additives to give the plastic high impact characteristics and results in coloration of the plastic and increases material and production costs. Furthermore, both sonic welding and liquid bonding preclude access to the tape which may be necessary to the recovery of tape where a tape does jam or tear. Thus, digital cassettes are typically screwed together (a costly assembly process to permit disassembly in case of tape jam).

SUMMARY OF THE INVENTION

A principal object of the present invention is a cassette comprising a pair of sleeves enclosing the active components which include a tape reel and hub assembly, tape guiding and tensioning member assembly and a tape back-up pressure assembly. The sleeves are removably inserted within a body member and held therein by mechanical forces eliminating the need for sonic welding and liquid bonding. The elimination of sonic welding and liquid bonding permits the use of low-cost, clear, general-purpose plastics. The elimination of undercuts in the design of the various parts permit optimization of the full shot capacity of an ejection molding machine generating lower costs in the manufacture of the parts. Furthermore, by eliminating undercuts, the parts can be molded vertically instead of horizontally, increasing throughput and further reducing costs.

A further object of the present invention is a cassette in which tape whipping, looping, spilling and uneven winding are reduced to a minimum. In accordance with this object, there is provided a pair of self-adjusting rollers which maintain the tape under sufficient tension to permit high speed recording as, for example, 120 inches per second or over sixty times the playback speed of typically 1⅞ inches per second used with conventional cassettes. The self-adjusting rollers are allowed to move in curved slots in recesses to absorb tape shock and slack, etc., and thus act as true idlers. The wheels take up the slack in the tape due to the centrifugal forces acting on the wheel as it is driven by the tape bearing against its surface. As the tape speed increases, so does the centrifugal force which causes the roller to move further along the recess. In present day cassettes, all rollers are fixed and hence are quite unfunctional as far as tape tension control is concerned.

To further control the movement of the tape there is further provided a pair of oppositely directed spring-like members mounted in cantilever fashion for slideable engagement with each reel hub within the cassette. Each spring-like member is typically ring shaped and is so positioned that a slight tilt is imparted to the reel hub compared with the horizontal axis of the cassette when the hub is at rest. As the hub rotates, the hub is driven more parallel to the horizontal axis of the cassette as by gyroscopic forces compressing the two rings that touch its edges on opposite sides. The amount of drag imparted to the hub depends on the angle of the ring springs and the speed of the hub. The magnitude of the drag is typically choosen to be within the range of 0–2 grams.

In effect, this tension system sets up an equilibrium between the idler wheel previously discussed and the equipment drive. The canted or edge pressure is better than straight down pressure because the latter would be too strong a pressure, would not be capable of automatic release as the hub speed slows and would displace the tape pack.

In practice, while the self-adjusting idler pulley system is found to contribute little to tape control once the change in the direction of the tape has occurred, the above described additional tension control system on the reel hubs appears to take up and absorb tape shock and slacks to the dynamic mode.

These and other features of the present invention will become apparent in the following detailed description and accompanying drawings hereinafter described.

DETAILED DESCRIPTION OF THE DRAWINGS

Figure 1:
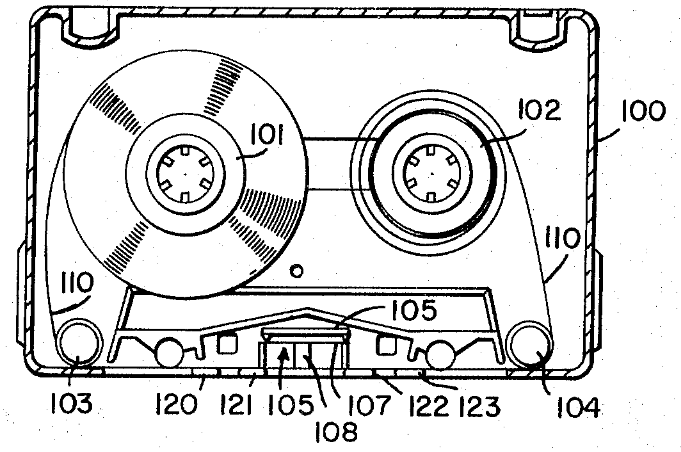
FIG. 1 is a plan view of a prior art cassette, with a wall omitted, exposing the active components.
Figure 2A:
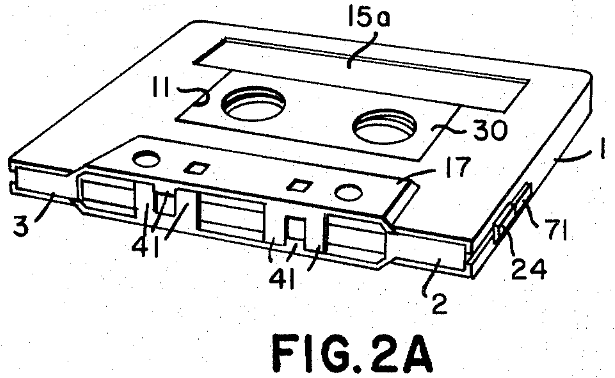
FIG. 2A is a perspective view looking from the front toward the rear of the cassette of the present invention showing the sleeves within the body member.
Figure 2B:
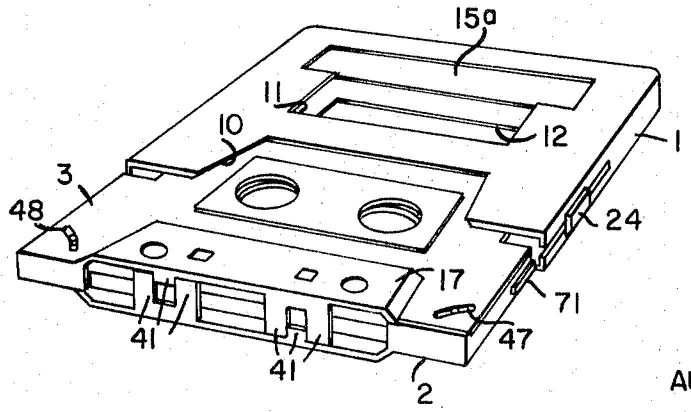
FIG. 2B is a perspective view looking from the front toward the rear of the cassette of the present invention showing the sleeves partially inserted within the body member.
Figure 2C:
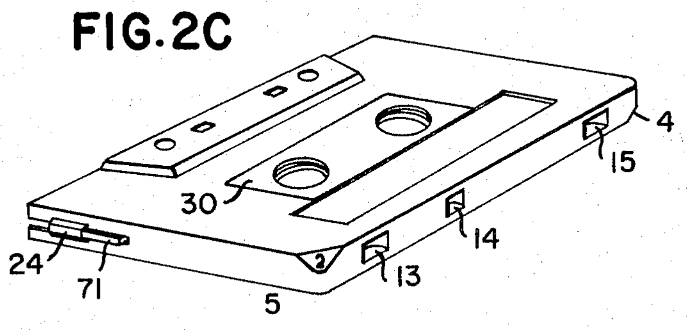
FIG. 2C is a rear perspective view of the cassette of the present invention.
Figure 2D:
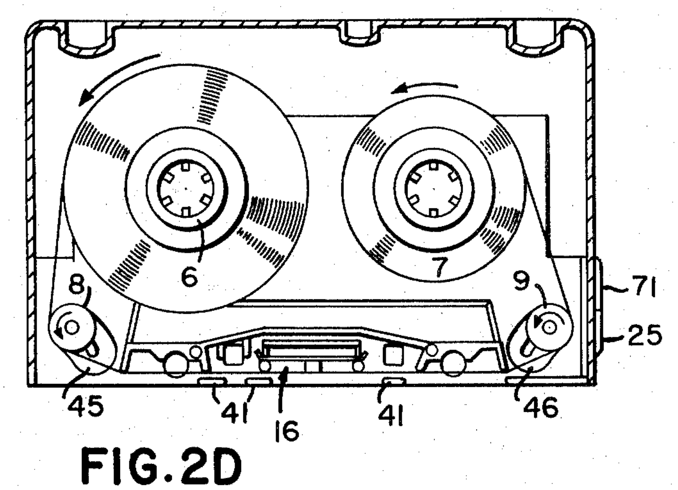
FIG. 2D is a plan view of FIG. 2A with the upper wall omitted to expose the active components.

Referring to FIG. 1, there is illustrated a conventional cassette comprising a body member 100 within which is rotatably mounted a pair of spoked-tape hubs 101, 102 and a pair of guide rollers 103, 104 having a fixed axis of rotation. A spring biased tape back-up pressure assembly 105 comprising an electrically conductive shield 105, fronted by an electrically conductive spring 107 bearing a pad 108 is mounted intermediate rollers 103, 104 at the front end of cassette body member 100. A magnetic tape 110, is selectively wound around hubs 101, 102 by means of machine located motor driven shafts (not shown) which engage hubs 101, 102 when the cassette is inserted into a machine. A plurality of apertures 120–123 are further provided in the front end of body member 100 to permit access to tape 110 by other machine located elements such as erase heads, record/playback heads and pressure rollers, not shown.

As tape 110 is transported at different and varying velocities from one of hubs 101, 102 to the other, a number of tape jamming events are found to occur frequently in cassettes of presently conventional design. Tape spillage can occur as shown by the loose coils about hub 102. This is generally caused by the hub free wheeling as the tape drive slows. While the machine located shaft engaging hub 102 could be modified to prevent or reduce freewheeling, studies have shown that few machines are so equipped. Looping can occur, as illustrated by the arcuate path of tape 110 between roller 103 and hub 101. Looping occurs when the velocity of hub 101 changes with respect to the velocity of tape 110. Uneven tape winding results in the tape edges brushing against the cassette walls, causing damage to the tape and uncontrolled amounts of friction affecting tape velocity and hence the accuracy with which magnetically recorded signals are extracted from the recording medium. These and other tape jamming events are well known to those familiar with cassettes.

Figure 3A:
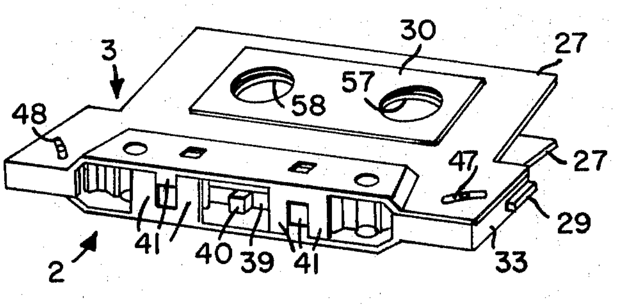
FIG. 3A is a perspective view of the sleeves of the present invention.
Figures 3B, 4, 5A:
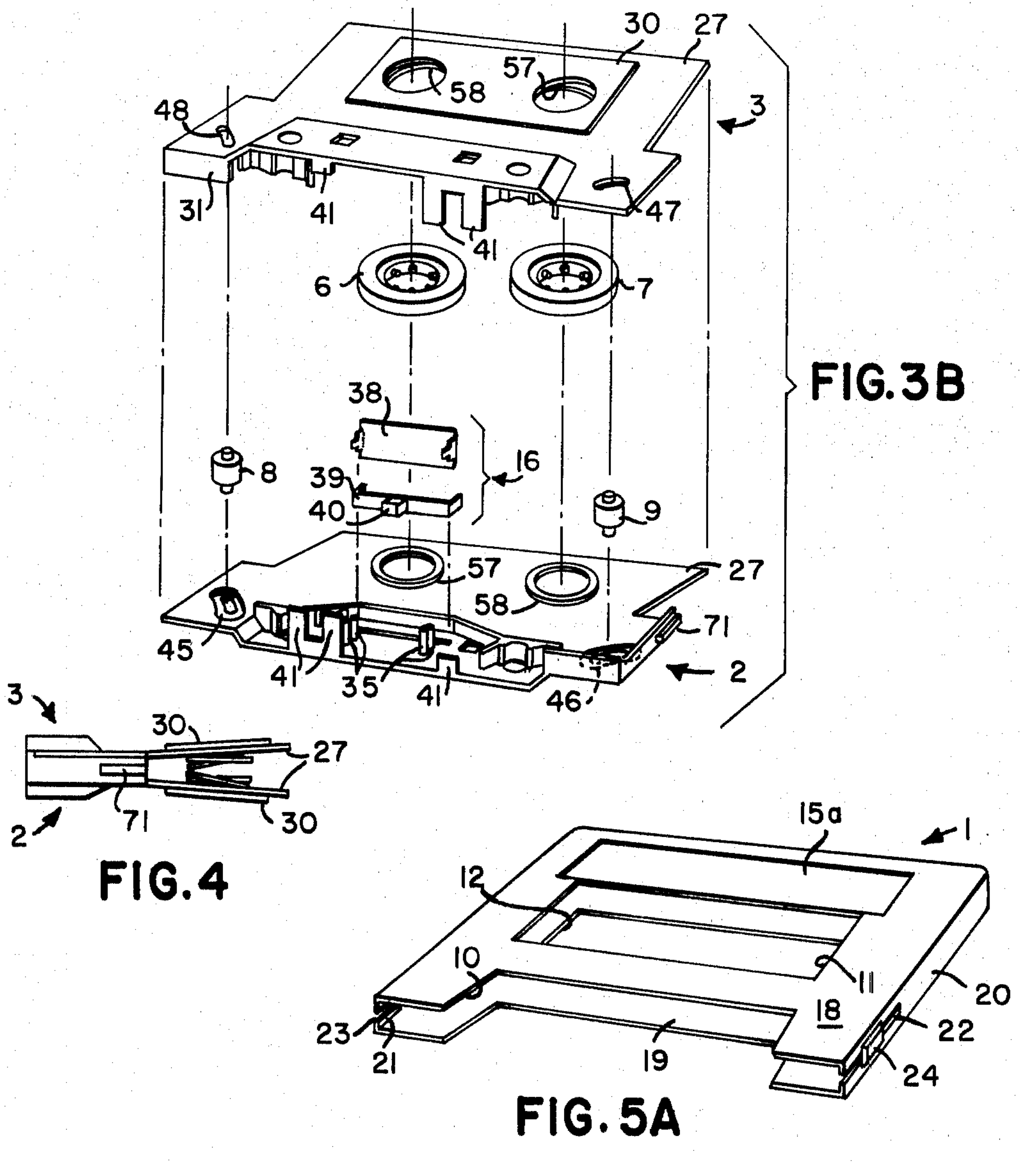
FIG. 3B is an exploded view of the sleeves and enclosed assemblies.
FIG. 4 is a side elevational view of FIG. 3A.
FIG. 5A is a front perspective view of the body member of the present invention.
Figure 5B:
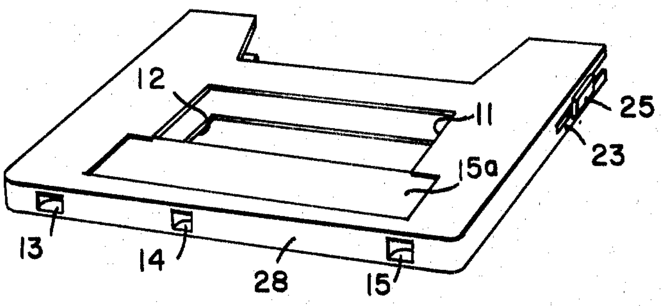
FIG. 5B is a rear perspective view of the body member of FIG. 5.
Figure 6:
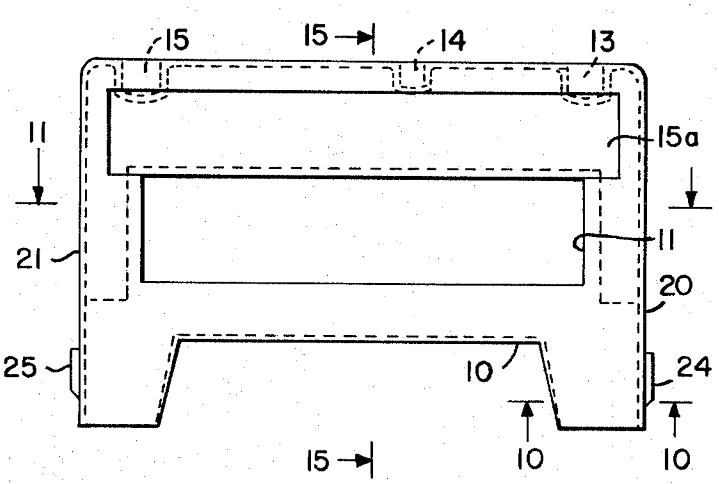
FIG. 6 is a planned view of the body member of FIG. 5.
Figure 7:
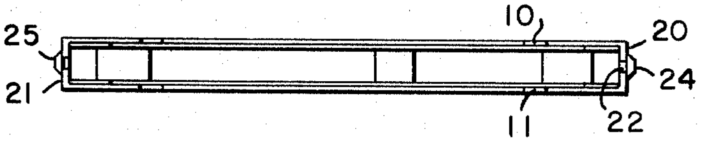
FIG. 7 is a front elevational view of the body member of FIG. 6.
Figure 8:
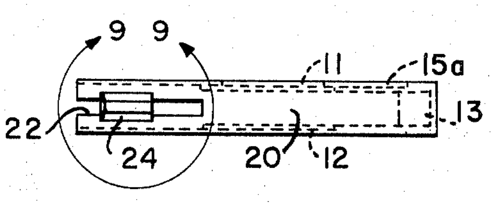
FIG. 8 is a side elevational view of the body member of FIG. 7.
Figure 9:
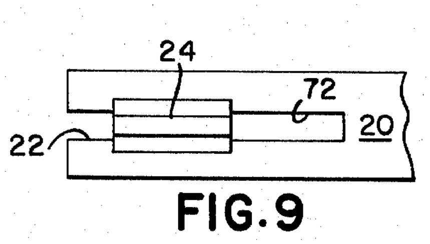
FIG. 9 is an enlarged view taken along lines 9—9 of FIG. 8.
Figure 10:
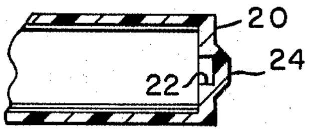
FIG. 10 is an enlarged partial sectional view taken along line 10—10 of FIG. 6.
Figure 11:
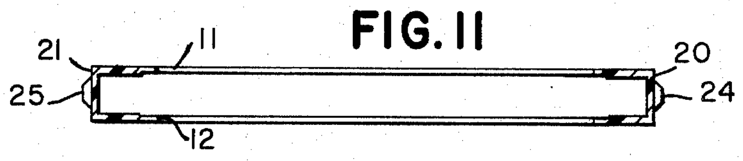
FIG. 11 is the cross sectional view taken along the lines 11—11 of FIG. 6.
Figure 12:
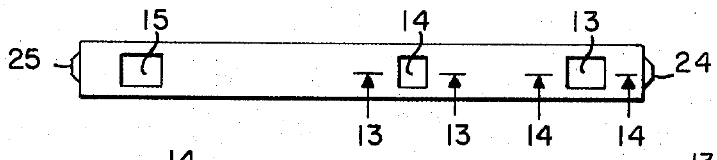
FIG. 12 is a rear elevation view of the body member of FIG. 6.
Figure 14:
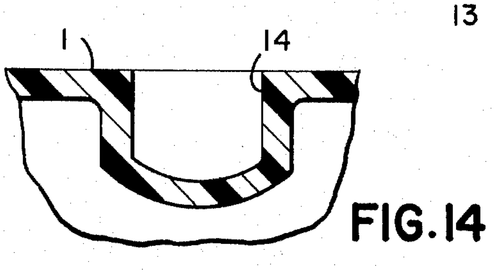
FIG. 14 is a partial cross sectional view taken along the lines 14—14 in FIG. 12.
Figure 13:
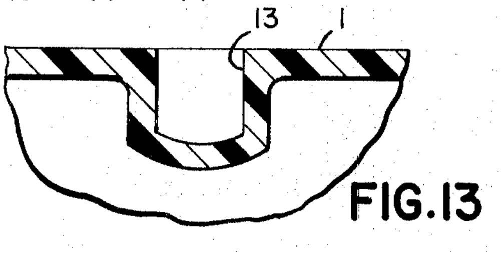
FIG. 13 is a partial cross sectional view taken along the lines 13—13 in FIG. 12.
Figure 15:
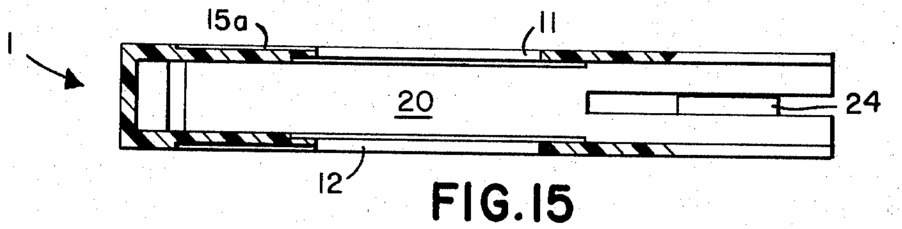
FIG. 15 is a cross sectional view taken along lines 15—15 of FIG. 6.

Referring to FIGS. 1–5 the cassette of the present invention comprises a body member 1, as shown in detail in FIGS. 5A, 5B, and a pair of sleeves 2,3 as shown in detail in FIGS. 2A–4. Sleeves, 2,3, enclose the active components of the cassette, which include a pair of tape reel hubs 6,7, a pair of idler rollers 8,9 and a tape back-up pressure assembly 16. Sleeves 2,3 are assembled in facing relationship and inserted within body member 1 wherein they are held mechanically so as to avoid the requirement for sonic welding, liquid bonding and fixing by screws, as has been the practice. As is well known sonic welding changes the memory of general purpose plastic making it brittle. This effect requires the use of additives to give the plastic high impact characteristics, this in turn results in coloration of the plastic and increases material and production costs. The avoidance of sonic welding as well as other types of bonding together with the elimination of undercuts in body members 1 and sleeves 2,3 permit the use of low-cost, clear, general-purpose plastic and air ejection molding techniques which results in high production rates. As will be apparent, sleeves 2,3 are identical in all respects thereby permitting the manufacture of the sleeves from a mold of a single design, further reducing manufacturing costs.

Figure 16A:
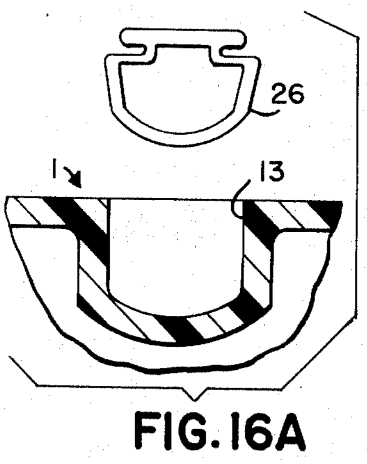
FIG. 16A–C are plan views of a plug used for closing the aperture shown in FIG. 14.
Figure 16B:
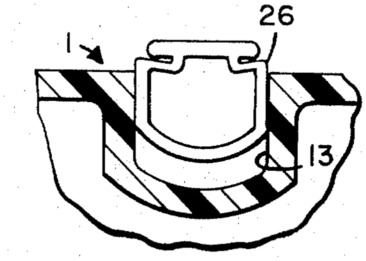
Figure 16C:
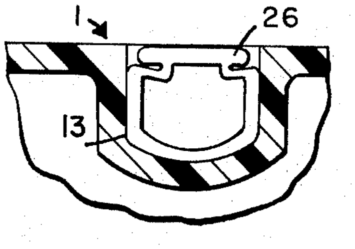
Figure 16D:
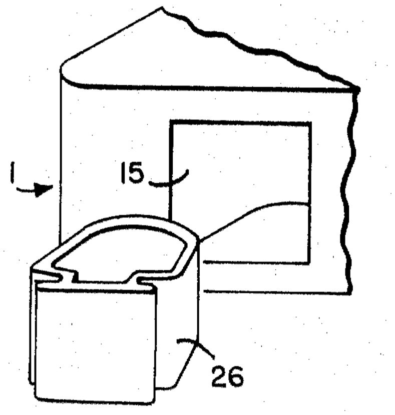
FIG. 16D is a perspective view of FIG. 16.

Referring to FIGS. 5–15, body member 1 comprises a generally rectangular, hollow, box-shaped member, formed without undercuts, thereby permitting the optimization of the full shot capacity of an injection molding machine. A recess portion 10 is provided in the front edge of body member 1 for receiving an enlarged front portion of sleeves 2,3. A pair of windows, 11, 12, are provided in the top and bottom walls 18, 19 respectively, of body member 1 approximately midway between the front and rear thereof. Windows 11, 12 are provided to engage a shouldered portion 30 of a taped sprocket length gauge plate 27 forming a rear part of sleeves 2,3 as herein described. A plurality of recesses 13–15 are provided in the rear wall portion 28 of body member 1 and cooperate with apparatus in a machine in which the cassette is used for controlling tape recording and reproduction in a conventional number. Side walls 20, 21 of body member 1 are provided with a pair of slots 22, 23 fronted by externally extending flange members 24, 25. Flange members 24, 25 and slots 22, 23 engage cooperating flange members 29 extending outwardly from a side wall 33 on sleeves 2,3 for locking sleeves 2,3 within body member 1. A plug 26, shown in detail in FIGS. 16A—16A, is inserted in recesses 13 and 15 to permit recording on a tape enclosed within the cassette. When plug 26 is removed no recording can take place. When plug 26 is inserted, one is able both to erase and record in a conventional manner. A similar plug (not shown) is inserted or removed from recess 14 and serves the same purpose. Whether one or more of recesses 13–15 are actually used depends entirely on the equipment in which the cassette is used.

Details of sleeves 2,3 are illustrated in FIGS. 17–31. As previously described, each sleeve 2,3 is made from a mold of the same design such that when one sleeve member is placed in relationship with another sleeve member made from the same mold there results an enclosure for enclosing the tape reel and hub assemblies 6,7 the tape guiding members or idler rollers 8,9 and the tape backup pressure assembly 16 hereinafter described. Accordingly, it is understood that the following description with respect to sleeve 2 applies as well to sleeve 3.

Figure 17:
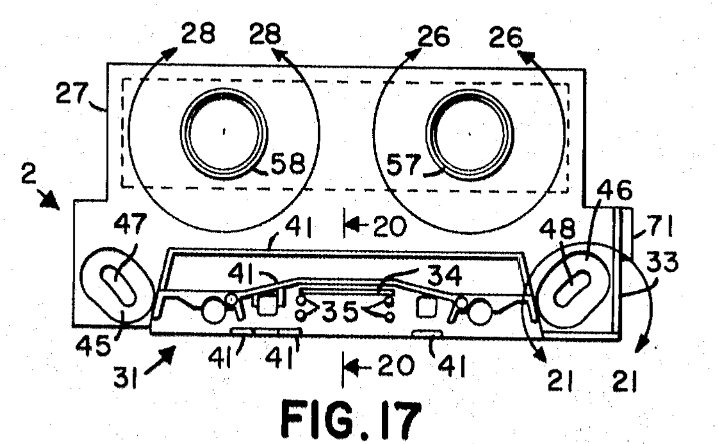
FIG. 17 is a plan view of the sleeves of the present invention.
Figure 18:
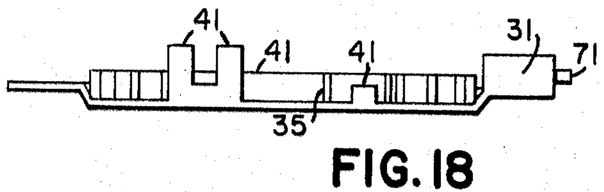
FIG. 18 is an elevation view of FIG. 17.
Figure 19:
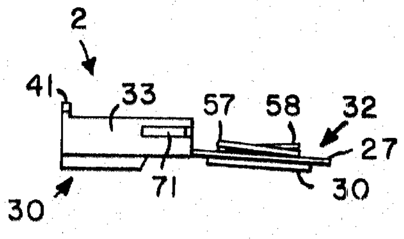
FIG. 19 is the side elevation view of FIG. 18.

Referring to FIG. 17–19, sleeve member 2 comprises a front section 31 and the rear section or tape sprocket length gauge plate 27. Plate 27 extends rearwardly from Section 31 at a slightly outwardly directed angle to the surface of front section 31 as shown more clearly in FIG. 19. The resiliency of the material of sleeve 2 cooperates with this angular displacement to insure seating of a shouldered portion 30 of plate 27 in window 12 of body member 1.

Referring to front section 31, there is provided a slot 34 and a plurality of vertically rising pins 35, 36 for receiving and retaining the tape back-up pressure assembly 16 shown in more, detail in FIG. 3B. Tape back-up pressure assembly 16 comprises an electrically conductive plate 38 and a resilient spring member 39 on which is mounted a non-conductive or felt pad 40. Plate 38 rests in slot 34 in electrical communication with spring 39 rearward of pins 35. Pins 36 provide additional mechanical support for front section 31 in cooperation with a plurality of wall members 41 extending perpendicularly from the surface of front section 31. Tape back-up pressure assembly 16 serves to eliminate static electricity from the tape rod and insures tape contact with the equipment recording head in a conventional manner.

Figures 20, 21, 22, 23, 24, 25, 26, 27:
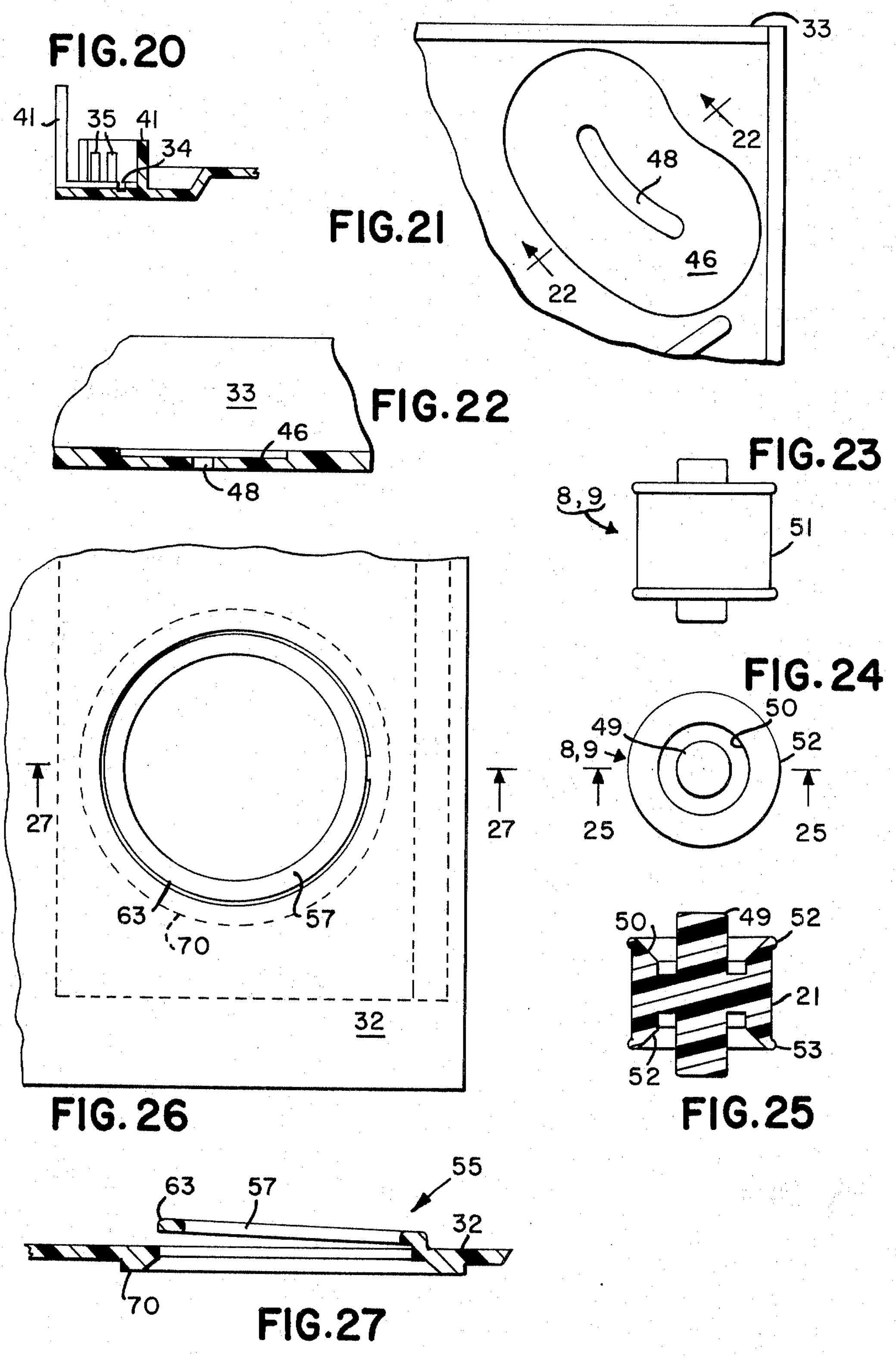
FIG. 20 is a partial cross sectional elevation view taken along the lines 20—20 of FIG. 17.
FIG. 21 is an enlarged plan view of the idler roller recess and slot taken along lines 21—21 of FIG. 17.
FIG. 22 is a cross sectional elevation view taken along the lines 22—22 of FIG. 21.
FIG. 23 is an elevation view of the idler roller of the present invention.
FIG. 24 is a planed view of FIG. 23.
FIG. 25 is a cross sectional elevational view taken along the lines 25—25 of FIG. 24.
FIG. 26 is an enlarged plan view of the right hub ring taken along lines 26—26 of FIG. 17.
FIG. 27 is a cross sectional elevational view taken along lines 27—27 of FIG. 26.
Figures 28, 29:
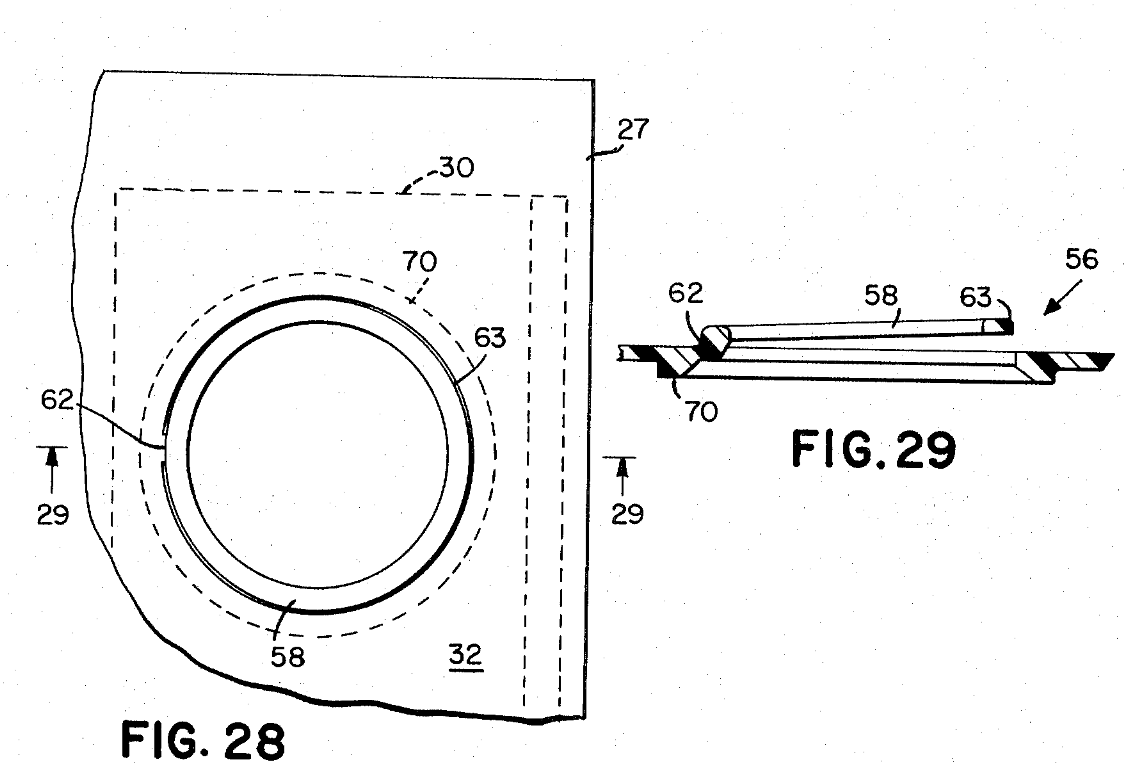
FIG. 28 is an enlarged partial planed view of the left hub ring taken along the lines 28—28 of FIG. 17.
FIG. 29 is a partial elevation view taken along lines 29—29 of FIG. 28.
Figure 30:
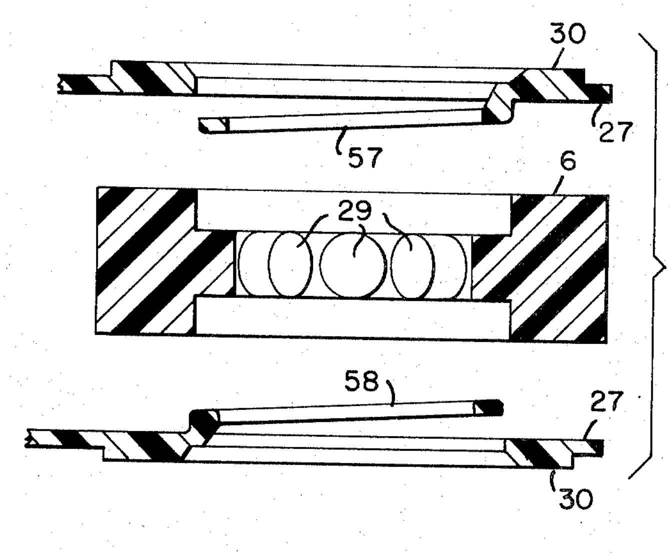
FIG. 30 is a partial cross sectional exploded elevation view of the reel hub, hub springs and sleeves of FIG. 2.
Figure 31:
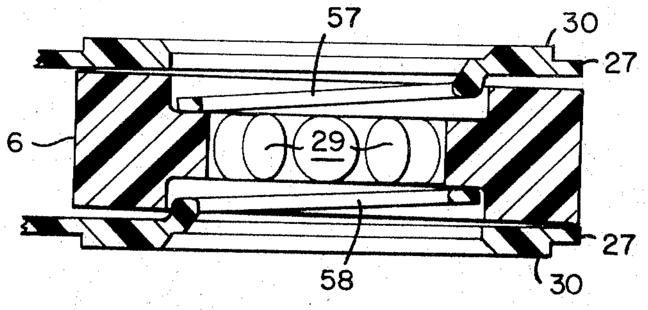
FIG. 31 is an unexploded view of FIG. 30.

On either side of tape back-up pressure assembly 16 in the corner portions of front sections 31 there are provided a pair of arcuate tape-guiding member recesses 45, 46 shown in more detail in FIGS. 21–22. A pair of arcuate slots 47, 48 are provided in the center of recesses 45, 46 for freely receiving a shaft 49 on the idler rollers 8,9 as shown in detail in FIGS. 23–25.

Referring to FIGS. 23–25 rollers, 8,9, both of which are identical, are provided with a tape bearing surface 51 parallel with shaft 49. Tape bearing surface 51 is bounded on both ends by a pair of outwardly directed rolled lips 52, 53. Lips 52, 53 serve to restrict the amount of surface contact rollers 8,9 make with the surface of recesses 45, 46 thereby reducing friction and at the same time restrict the motion of the tape in a direction parallel with shaft 49. Unless such motion of the tape is restrained there results an uneven winding of the tape on reel hubs 6,7 which causes a reel of tape to assume a dish-shaped appearance and make contact with the inside surfaces of the sleeves. Such contact results in fraying of the edges of the tape and loss of tape velocity control. Idler rollers 8,9 are further provided with recesses 50,52 which serve to reduce the weight of the rollers, thereby further reducing friction and material for manufacture and lessening material shrinkage.

In operation, as the velocity of the tape bearing against idler rollers 8,9 changes during starting and stopping operations, the centrifugal and friction forces affecting idler rollers 8,9 causes rollers 8,9 to move along the path of slots 47, 48 to absorb tape shocks and slack. In practice, idler rollers 8,9 are found to greatly reduce whipping and looping of the tape which has heretofore resulted in jamming, particularly during the stopping and starting of the tape transport operation.

To further reduce whipping and looping of a tape, which is found to occur even after the tape is brought up to speed, there is further provided on the interior surface of sprocket length gauge plate 27 of sleeve 2, a pair of resilient biasing members 55, 56 which bear against the right and left tape reel hubs 6,7 for applying, by means of friction, a retarding force for controlling the speed of rotation of the hubs as shown in more details in FIGS. 26–31.

Referring to FIGS. 26–29, resilient biasing members 55, 56 comprise a pair of ring-shaped members 57, 58 mounted in cantilever fashion to the inside surface of plate 27, substantially coaxial with the axis of rotation of hub members 6,7. The points of attachment 61, 62 of ring-shaped members 57, 58 toward the front and rear of plate 27 are diametrically opposed such that when one sleeve is placed in facing relationship with another similar sleeve the points of contact 63, 64 of the free ends 65, 66 of members 57, 58 with each of hub members 6,7 are diametrically opposed as shown in more detail in FIGS. 4, 30, 31.

This will put a slight tilt to hub members 6,7 compared with the horizontal axis of the cassette body when they are at rest, and clearance is provided for this. When the machine drives the tape and hub member 6,7 rotate, the hubs 6,7 are driven more parallel to the cassette's horizontal axis as by gyroscopic action and compress the spring rings that touch their edges at opposite sides. This centers the hub and puts a slight amount of drag on the tape. The amount of drag depends on the angle that ring-shaped members 57, 58 make with plate 27 and the resiliency of the material. As the rate of rotation accelerates the compression is greater. In practice the angle ring-shaped members 57, 58 make with the plate 27 is chosen such that there is negligible drag when the hubs are stopped and up to 1–2 grams of drag when the hubs are rotating at speed.

This canted or edge pressure is found to be better than straight down pressure because the latter would be too strong a pressure, would not be capable of automatic release as the reel or hub speed slows and would displace the hub and tape causing improper reel alignment. This permits the cassette of the present invention to be used in those equipments generating very low starting torque.

Typically, air ejection molding is used in making the various parts of the cassette of the present invention. Body member 1 is made of impact styrene, sleeves 2,3 are made of general purpose styrene and hub member 59, 60 are made of high density polypopylene. As is conventional in ejection molding, a one-half degree draft is provided for appropriate walls to facilitate removal of the various parts from the molds by an air blast.

After molding and assembling the various parts as described between sleeves 2,3, sleeves 2,3 are inserted in body member 1. The flange or shouldered portion 30 of plate 27 engages windows 11, 12 of body member 1 and hold sleeves 2,3 within body member 1.

Due to the resilient nature of the material used in making the cassette, removal of sleeves 2,3 for loading and unloading tape therefrom is accomplished by depressing plate 27 of sleeves 2,3 to obtain release of plate 27 from windows 11, 12 while depressing flange 29 of sleeves 2,3 to obtain release of flange 29 from slots 22, 23 in side walls 33 of body member.

What is claimed is:

1. In a cassette having a housing with a first and a second wall enclosing a first tape reel, a second tape reel, a tape back-up pressure assembly and a tape guiding member for guiding tape to and from said first and said second reels disposed in the vicinity of a corner of said housing on either side of said tape back-up pressure assembly, the improvement comprising: an elongated horizontally extending recess provided in the interior surface of at least one of said first and said second walls for receiving said tape guiding member, said recess permitting horizontal movement of said tape guiding member within said recess as said tape is transported past said tape back-up pressure assembly for applying tension to said tape to reduce whipping and looping of said tape wherein said tape guiding member comprises a shaft disposed normal to said horizontal line of movement of said tape guiding member within said recess and said recess is further provided with a slot for receiving said shaft within which said shaft is free to move for providing said tension to said tape.

2. In a cassette according to claim 1 wherein said tape guiding member comprises an elongated cylindrically shaped roller adapted to freely rotate about said shaft and having a tape bearing surface extending parallel to said shaft for receiving said tape.

3. In a cassette according to claim 1 wherein said roller comprises radially extending lips on opposite ends of said tape bearing surface for receiving there between said tape for preventing movement of said tape in a direction parallel with said shaft.

4. In a cassette having a housing comprising a first wall and a second wall enclosing a rotatable tape reel hub, the improvement comprising; a resilient biasing means mounted within said housing in slideable contact with said reel hub for applying to said reel hub by means of friction a variable retarding force for controlling the speed of rotation of said reel hub about a first axis to reduce tape whipping and looping during normal rotation of said reel hub.

5. In a cassette according to claim 4, the improvement wherein said resilient biasing means is mounted within said housing in a cantilever fashion and the free end of said resilient biasing means makes slideable contact with a surface of said reel hub disposed normal to said first axis of rotation of said reel hub.

6. In a cassette according to claim 4, the improvement wherein said reel hub is free to rotate about an axis normal to said first axis of rotation and under the influence of said resilient biasing means assumes an angular position relative to said first and said second walls when said reel hub is not in motion for reducing the starting friction between said reel hub and said resilient biasing means to a negligible amount.

7. In a cassette, according to claim 6, the improvement wherein said resilient biasing means mounted in cantilever fashion within said housing comprises a first ring-shaped member mounted to said first walls substantially coaxial with said first axis of rotation of said reel hub and wherein the free end of said first ring-shaped member makes contact with the surface of said reel hub facing said first wall.

8. In a cassette according to claim 7 the improvement wherein said resilient biasing menas mounted in cantilever fashion within said housing further comprises a second ring-shaped member mounted to said second wall substantially coaxial with said first axis of rotation of said heel hub and wherein the free end of said second ring-shaped member makes contact with the surface of said reel hub facing said second wall.

9. In a cassette according to claim 8 the improvement wherein the free ends of said first and said second ring-shaped members are oppositely directed relative to one another.

10. A cassette comprising a first sleeve member: a second sleeve member mating with said first sleeve member for forming an enclosure for a tape reel assembly, a tape guiding assembly and a tape back-up pressure assembly; and a body member provided with a cavity or receiving said first and said second sleeve members for holding said first and said second sleeve member together in facing relationship.

11. A cassette according to claim 10 wherein said first and said second sleeve members comprise a front section enclosing said tape guiding members and said tape back-up pressure assembly; a rear section enclosing said tape reel assembly, said rear section extending rearward from said front section at an outwardly directed angle relative to the surface of said front section; and a first portion extending outwardly from said rear section for engaging a first portion of said body member.

12. A cassette according to claim 11 wherein said front portion of said first and said second sleeve members further comprise a side wall and a second portion extending outwardly from said side wall for engaging a second portion of said body member.

13. A cassette according to claim 12 wherein said first and said second portions of said body member are cutouts and said first and said second portions of said first and said second sleeve members are depressable for releasing and removing said first and said second sleeve members from said body member.

* * * * *